UNITED STATES PATENT OFFICE.

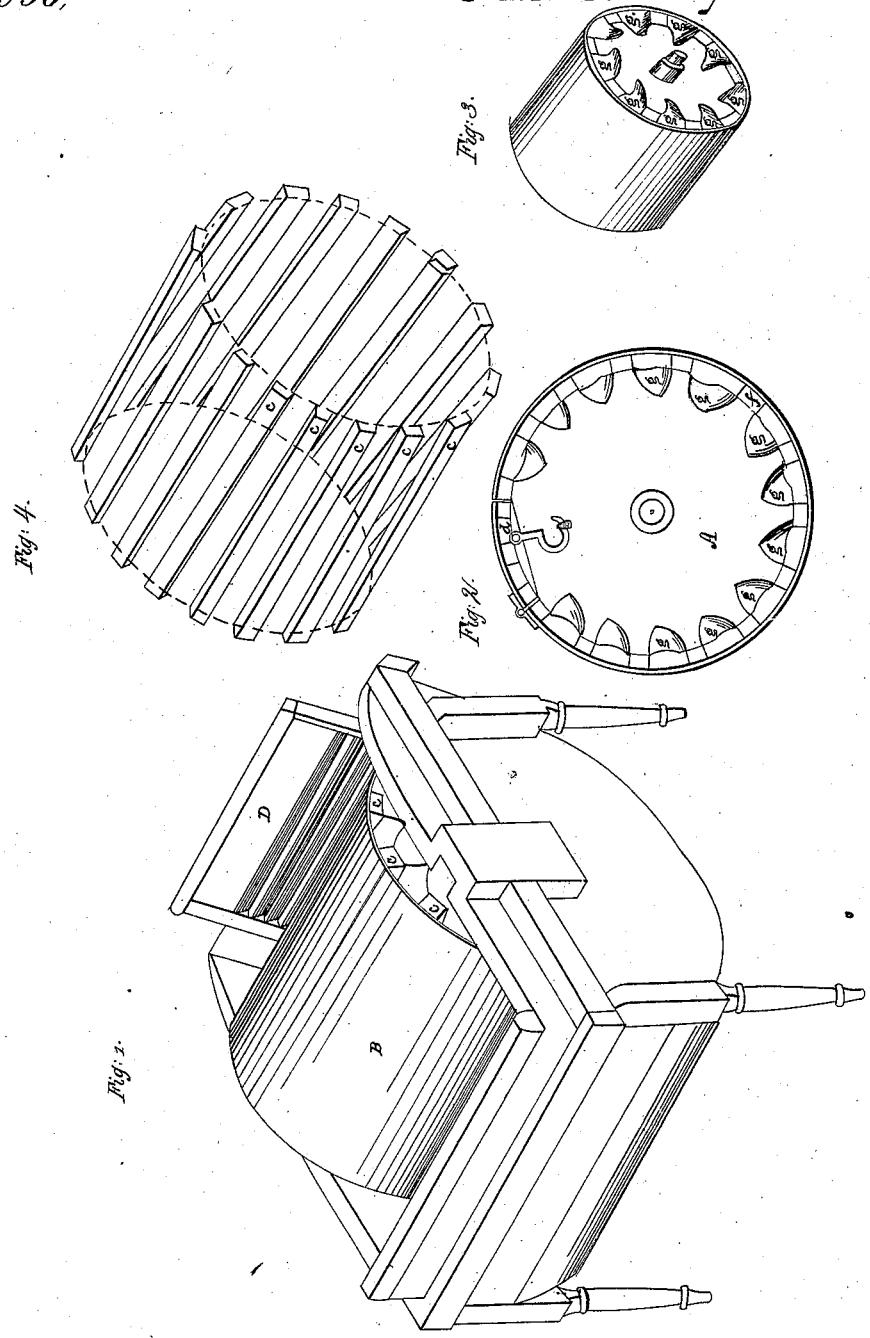

J. R. ROGERS, OF SACRAMENTO, WISCONSIN.

WASHING-MACHINE.

Specification of Letters Patent No. 24,056, dated May 17, 1859.

*To all whom it may concern:*

Be it known that I, JNO. R. ROGERS, of Sacramento, in the county of Green Lake and State of Wisconsin, have invented certain new and useful Improvements in Washing-Machines; and I do hereby declare the following to be a full, clear, and exact description of the same, reference being had to the annexed drawings, and the letters of reference marked thereon, as constituting a part of this specification.

The nature of my invention consists in the combination and arrangement of certain devices the peculiarities of which will be hereinafter fully set forth.

To enable others skilled in the art to make and use my invention I will describe its construction and operation.

Figure 1 is a perspective showing the machine complete and ready for use. Fig. 2 represents the heads of cylinder B. Fig. 3 is a perspective view of said cylinder showing the manner and form with which holes ($g\ g\ g$) are cut. Fig. 4 is also a perspective view and represents the manner in which slats ($c\ c\ c$) are placed around the periphery of heads A.

In constructing my machine, I first provide myself with a box shaped as represented by Fig. 1. I then nail or otherwise secure narrow slats diagonally around the heads of cylinder B. On each of these heads and between each of slats ($c\ c\ c$), I scoop out diagonally with the slats, holes or grooves ($g\ g\ g$) as is shown fully in Figs. 1, 2 and 3. I then cover the cylinder thus formed with tin, so that the water can have no other entrance or exit, save through these holes. Thus in the revolution of cylinder (B) constant currents of water are being forced in and out of holes ($g\ g\ g$) which currents are directed by the diagonal slats ($c\ c\ c$), and may be instantly reversed by reversing the motion of the cylinder.

($d$) is a door or lid, hinged on to one of the slats ($c$) and is fastened by means of hook and staple. Through the center of each head is placed a shaft upon one of which is attached a crank. About the center and on each side of the box-bearings are made for shafts of the cylinder.

D is an ordinary washboard which may be secured on one end of box for convenience of certain occasions.

The operation of my machine is as follows: Water being placed in the box, the articles that require to be washed are put on the inside of cylinder, through the lid or door, $d$, which can then be closed and secured by the hook and staple, as shown in Fig. 2. Motion is then given to cylinder by means of crank. Currents of water are taken in one side of the cylinder through the holes ($g\ g\ g$) and by the diagonal slats are forced out on the opposite side. The currents may be reversed by reversing the motion of the cylinder. By this simple process clothes may be washed effectually without beating and rubbing them to pieces.

I do not claim any and every mode of forcing the water in and out of the cylinder, my invention being more particularly confined to the construction of the said cylinder and its heads for producing alternate currents of water as the direction of the revolution of the cylinder is changed, in the manner hereinbefore described.

Having thus fully described my invention what I claim as new and desire to secure by Letters Patent is:—

The combination in the cylinder B, of the diagonal slats $c, c, c, c$, with the two heads of the cylinder when said heads are provided with holes of such a shape and form, that they will collect and force the water in, and empty it, at alternate ends of the cylinder as the direction of its revolutions are changed, substantially as is herein fully set forth.

J. R. ROGERS.

Witnesses:
J. F. HAMILTON,
J. S. WRIGHT.